US010209954B2

(12) United States Patent
Sullivan et al.

(10) Patent No.: US 10,209,954 B2
(45) Date of Patent: Feb. 19, 2019

(54) EQUAL ACCESS TO SPEECH AND TOUCH INPUT

(75) Inventors: Anne Sullivan, San Francisco, CA (US); Lisa Stifelman, Palo Alto, CA (US); Adam Elman, Sunnyvale, CA (US); Ken Thai, Sunnyvale, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 234 days.

(21) Appl. No.: 13/372,850

(22) Filed: Feb. 14, 2012

(65) Prior Publication Data

US 2013/0207898 A1 Aug. 15, 2013

(51) Int. Cl.
*G06F 3/033* (2013.01)
*G06F 3/16* (2006.01)

(52) U.S. Cl.
CPC .................. *G06F 3/167* (2013.01)

(58) Field of Classification Search
USPC ............... 345/156–180; 700/1–89, 90–306; 715/700–860
See application file for complete search history.

(56) References Cited

U.S. PATENT DOCUMENTS

| | | | |
|---|---|---|---|
| 5,819,225 A * | 10/1998 | Eastwood et al. ............ 704/275 |
| 7,363,029 B2 | 4/2008 | Othmer | |
| 7,552,054 B1 | 6/2009 | Stifelman et al. | |
| 7,685,252 B1 | 3/2010 | Maes et al. | |
| 7,941,481 B1 | 5/2011 | Partovi et al. | |
| 8,204,995 B2 | 6/2012 | Sathish | |
| 8,473,622 B2 | 6/2013 | Sathish | |
| 8,769,009 B2 | 7/2014 | Maskey et al. | |
| 8,788,269 B2 | 7/2014 | Stifelman et al. | |
| 2003/0149803 A1 | 8/2003 | Wilson | |
| 2003/0233237 A1 * | 12/2003 | Garside .................. G06F 3/038 704/270 |
| 2004/0236574 A1 | 11/2004 | Ativanichayaphong et al. | |
| 2007/0124507 A1 * | 5/2007 | Gurram ................. G06F 3/0481 710/1 |
| 2008/0147406 A1 | 6/2008 | Da Palma et al. | |
| 2008/0228494 A1 | 9/2008 | Cross | |
| 2009/0030800 A1 | 1/2009 | Grois | |
| 2009/0170561 A1 | 7/2009 | Chou | |
| 2009/0187846 A1 * | 7/2009 | Paasovaara ................... 715/780 |
| 2009/0216531 A1 | 8/2009 | Yanagihara | |
| 2010/0031143 A1 | 2/2010 | Rao et al. | |
| 2010/0281435 A1 | 11/2010 | Bangalore et al. | |
| 2011/0115702 A1 | 5/2011 | Seaberg | |

(Continued)

FOREIGN PATENT DOCUMENTS

WO   WO 2013085528 A1 *   6/2013   ........... G06F 3/0485

OTHER PUBLICATIONS

Harada, et al., paper entitled "Voice Games: Investigation Into the Use of Non-Speech Voice Input for Making Computer Games More Accessible," 18 pages, Published Sep. 5, 2011.

(Continued)

*Primary Examiner* — Nelson Rosario
*Assistant Examiner* — Andrew Lee (57) ABSTRACT

Input access may be provided. A user interface may be displayed on a user device. Upon receiving a selection of at least one element of the user interface, a plurality of input receiving modes of the user device may be activated.

20 Claims, 4 Drawing Sheets

(56) References Cited

U.S. PATENT DOCUMENTS

| | | | |
|---|---|---|---|
| 2011/0161080 A1* | 6/2011 | Ballinger et al. | 704/235 |
| 2011/0246944 A1* | 10/2011 | Byrne et al. | 715/835 |
| 2012/0022874 A1* | 1/2012 | Lloyd et al. | 704/275 |
| 2013/0283195 A1* | 10/2013 | Bilgen | G06F 3/04886 715/767 |
| 2014/0330570 A1 | 11/2014 | Stifelman et al. | |

OTHER PUBLICATIONS

U.S. Appl. No. 13/327,339, entitled Satisfying Specified Intent(s) Based on Multimodal Request(s), filed Dec. 15, 2011.

"Speak4it", Retrieved at <<http://www.speak4it.com/news>>, Retrieved Date: Nov. 15, 2011, pp. 4.

Bolt, Richard A., "Put-That-There": Voice and Gesture at the Graphics Interface, Retrieved at <<http://media.mit.edu/speech/old/papers/1980/bolt_SIGGRAPH80_put-that-there.pdf>>, Proceedings of the 7th annual conference on Computer graphics and interactive techniques (SIGGRAPH), Jul. 1980, pp. 262-270.

Paek et al., "Search Vox: Leveraging Multimodal Refinement and Partial Knowledge for Mobile Voice Search", Retrieved at <<http://research.microsoft.com/en-us/um/redmond/groups/cue/publications/uist2008-searchvox.pdf>>, Proceedings of the 21st annual ACM symposium on User interface software and technology (UIST), Oct. 19-22, 2008, pp. 141-149.

Sharma, et al., "Speech-Gesture Driven Multimodal Interfaces for Crisis Management", Retrieved at <<http://ieeexplore.ieee.org/stamp/stamp.=sp?tp=&arnumber=1230213>>, Proceedings of the IEEE, vol. 91, Issue 9, Sep. 8, 2003, pp. 1327-1354.

U.S. Appl. No. 13/327,339, Amendment and Response filed Jan. 6, 2014, 30 pgs.

U.S. Appl. No. 13/327,339, Notice of Allowance dated Mar. 10, 2014, 7 pgs.

U.S. Appl. No. 13/327,339, Office Action dated Sep. 6, 2013, 8 pgs.

U.S. Appl. No. 14/337,175, Amendment and Response filed Jul. 5, 2016, 11 pgs.

U.S. Appl. No. 14/337,175, Notice of Allowance dated Aug. 16, 2016, 8 pgs.

U.S. Appl. No. 14/337,175, Notice of Allowance dated Sep. 8, 2016, 4 pgs.

U.S. Appl. No. 14/337,175, 1.312 Amendment filed Nov. 16, 2016, 9 pages.

U.S. Appl. No. 14/337,175, Response to 1.312 Amendment dated Dec. 12, 2016, 2 pages.

U.S. Appl. No. 14/337,175, Office Action dated Apr. 4, 2016, 6 pgs.

\* cited by examiner

EQUAL ACCESS TO SPEECH AND TOUCH INPUT

BACKGROUND

Equal access to input modes may be provided. In conventional systems, adding speech input capability to an existing touch interface takes one of two forms—either an icon is added to a text field to signal speech is available or a button is added to the keyboard. The disadvantage of adding icons to all text fields is that it visually clutters the user interface because all speech enabled fields need to have an icon. The disadvantage of putting a microphone on a keyboard is that it makes speaking to the device two steps away: first, you have to tap the field to bring up a keyboard and then you have to press a separate button to speak. Creating an extra step can reduce the likelihood of people using speech and users are more likely to start typing since they're habituated into that behavior.

SUMMARY

This Summary is provided to introduce a selection of concepts in a simplified form that are further described below in the Detailed Description. This Summary is not intended to identify key features or essential features of the claimed subject matter. Neither is this Summary intended to be used to limit the claimed subject matter's scope.

Input access may be provided. A user interface may be displayed on a user device. Upon receiving a selection of at least one element of the user interface, a plurality of input receiving modes of the user device may be activated.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

Equal access to different input modes may be provided. When a user selects a speech-enabled field in a user interface, a listening state may be triggered and/or a keyboard interface element may be displayed. Example phrases may be displayed to help set user expectations of what can be input via speech based on what type of field the user tapped (e.g., full dictation vs. listening for a more scoped set of things like a credit card number). Once the user begins inputting data via one of the modes, the other input modes may be deactivated. For example, as the user begins speaking, the keyboard display may be removed from the user interface.

Figure 1:
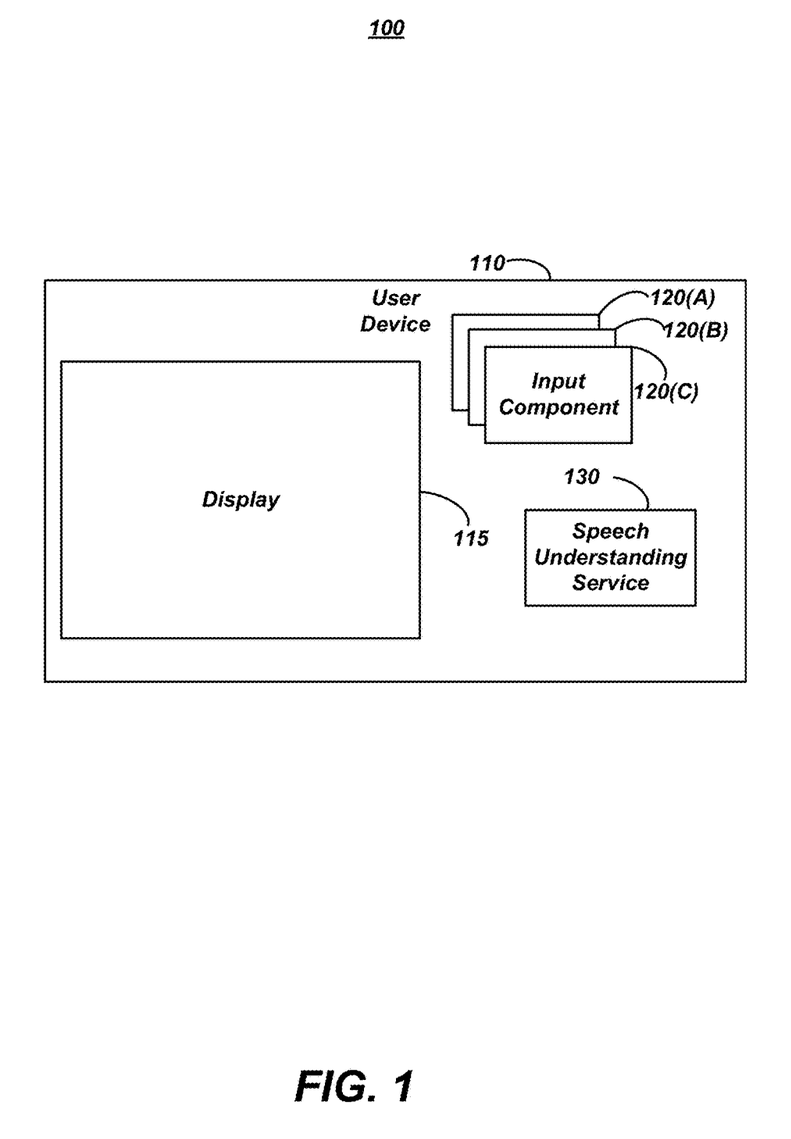
FIG. 1 is a block diagram of an operating environment.

FIG. 1 is a block diagram of an operating environment 100 for providing equal access to input modes comprising a user device 110. User device 110 may comprise a display 115 operative to output application data and/or user interfaces, such as a monitor and/or touchscreen. User device 110 may comprise, for example, an electronic communications device such as a computer, laptop, cellular and/or IP phone, tablet, game console and/or other device. User device 110 may also comprise a plurality of input mode components 120(A)-(C) such as a keyboard input mode component and/or a microphone coupled to a speech input mode component. The speech input mode component (e.g., input mode component 120(A)) may provide audio inputs to a speech understanding service 130 for conversion into a text format and content analysis.

Figure 2:
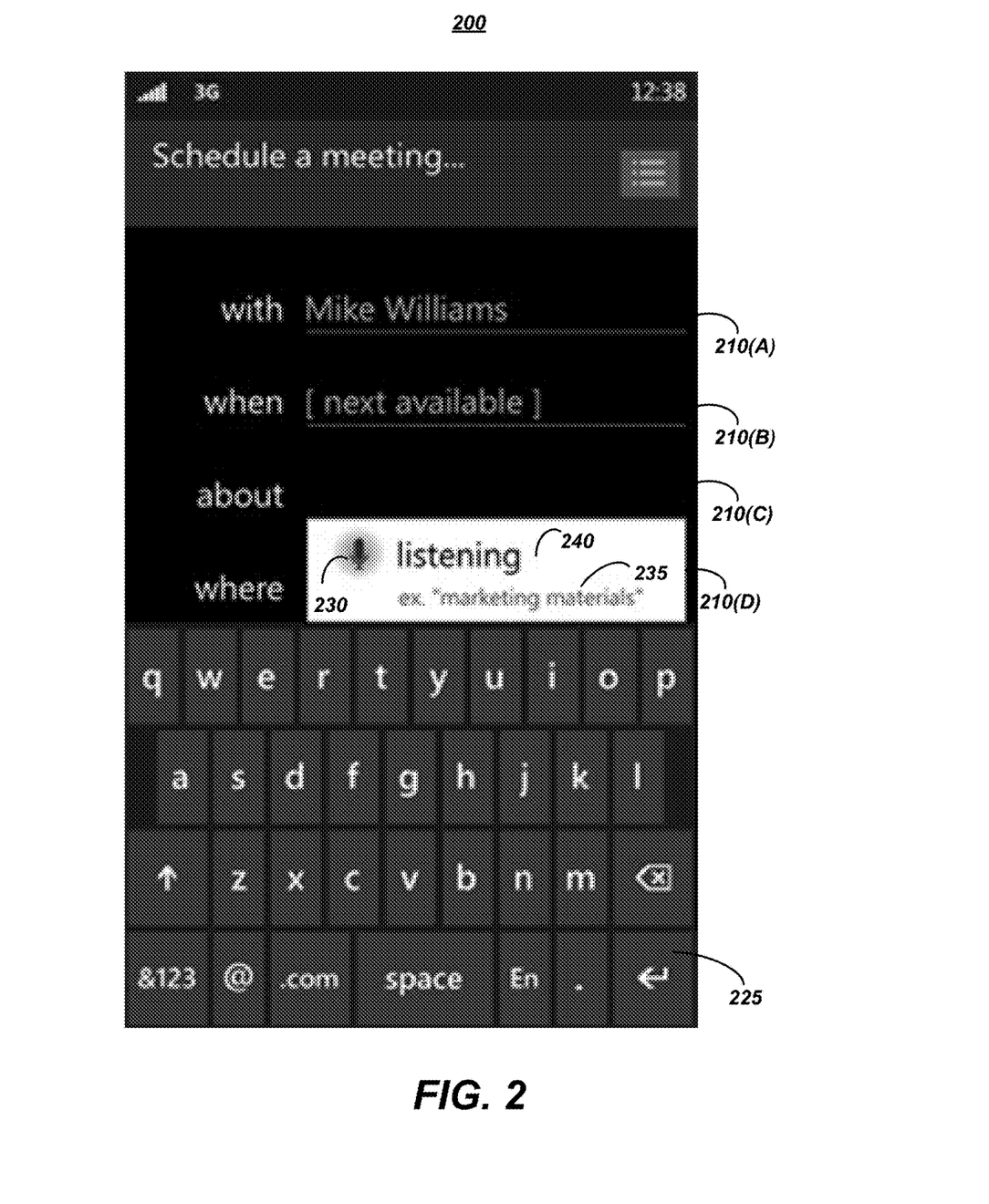
FIG. 2 is a diagram of an example user interface.

FIG. 2 is a diagram of an example user interface 200 comprising a plurality of input fields 210(A)-(D). User interface 200 may indicate that input modes are available such as by displaying a touchscreen keyboard 225, an animation, a microphone icon 230, and/or another visual effect proximate to an active one of the plurality of input fields 210(A)-(D). User interface 200 may also display an example input 235 according to a type of the active one of the plurality of input fields 210(A)-(D). Upon receiving an input, such as a spoken input to the active one of the plurality of input fields 210(A)-(D), user interface 200 may display an indication 240 that the input is being received, such as by displaying "listening" while spoken input is being received.

Figure 3:
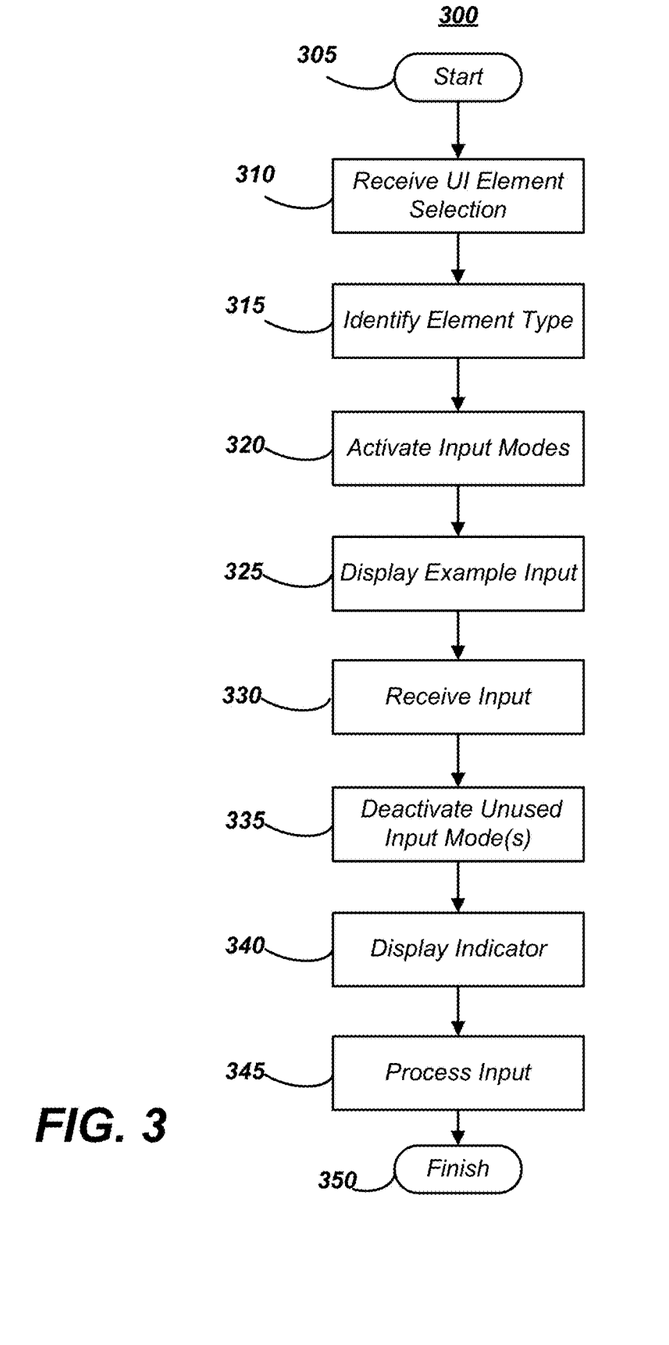
FIG. 3 is a flow chart of a method for providing input mode access.

FIG. 3 is a flow chart setting forth the general stages involved in a method 300 consistent with an embodiment of the invention for providing input mode access. Method 300 may be implemented using a computing device 400 as described in more detail below with respect to FIG. 3. Ways to implement the stages of method 300 will be described in greater detail below. Method 300 may begin at starting block 305 and proceed to stage 310 where computing device 400 may receive a selection of an element of a user interface. Such elements may be displayed on display 115 of user device 110. Inputs may be received by plurality of input mode components 120(A)-(C), such as a keyboard, a stylus, a mouse, a touchscreen, a motion/gesture capture component, and/or a microphone.

Method 300 may then advance to stage 315 where computing device 400 may identify a type of the selected user interface element. For example, input field 210(A) may comprise a name input field, input field 210(B) may comprise a time/date input field, and input field 210(C) may comprise a text subject field. For another example, input field 210(C) may comprise a free-form input field. Inputs to this field may be provided to speech understanding service 130 to determine the user's intent. For example, when the user says "I'd like to meet with Brian at 4 pm tomorrow," speech understanding service 130 may determine that the intent is to schedule a meeting, Brian is the contact name, and 4 pm tomorrow is the meeting time.

Method 300 may then advance to stage 320 where computing device 400 may activate a plurality of input modes according to the identified type. For example, when the text subject input field 210(C) is selected, user device 110 may activate at least a speech input mode and a keyboard input mode.

Method 300 may then advance to stage 325 where computing device 400 may display at least one example input according to the identified type. For example, when the text subject input field 210(C) is selected, a previously used subject may be displayed, such as "ex. marketing materials". Other displays may comprise frequently entered inputs by the user and/or common inputs to an input field of that type.

Method 300 may then advance to stage 330 where computing device 400 may receive an input for the selected user interface element. For example, the user may speak a subject as the input to text subject input field 210(C).

Method 300 may then advance to stage 335 where computing device 400 may de-activate any unused input modes. For example, when a spoken input is received by a spoken input component (e.g., input component 120(A)), other input components may be deactivated, such as by removing touchscreen keyboard 225 from display 115 and/or turning off speech recognition when the user begins typing on touchscreen keyboard 225.

Method 300 may then advance to stage 340 where computing device 400 may display an indicator that the active input mode is receiving the input. For example, user device 110 may display microphone icon 230 while spoken input is being received and/or adjust a visual effect on the display, such as by animating a glow effect on an icon and/or the input field.

Method 300 may then advance to stage 345 where computing device 400 may process the received input. For example, the displayed example input may be removed from the user interface. A spoken input may be provided to speech recognition service 130, which may be optimized according to the type of the selected input element. The recognized input may be received from speech recognition service 130 and the user interface element may be populated with the recognized input. Method 300 may then end at stage 350.

An embodiment consistent with the invention may comprise a system for providing input mode access. The system may comprise a memory storage and a processing unit coupled to the memory storage. The processing unit may be operative to display a user interface on a user device, receive a selection of at least one element of the user interface, and activate a plurality of input receiving elements of the user device.

Another embodiment consistent with the invention may comprise a system for providing input mode access. The system may comprise a memory storage and a processing unit coupled to the memory storage. The processing unit may be operative to display a user interface, receive a selection of an element of the user interface, activate a plurality of input receiving modes, receive an input via a first input receiving mode of the plurality of input receiving modes, and deactivate at least one second input receiving mode of the plurality of input receiving modes. The processing unit may be further operative to display an availability indicator associated with at least the first input mode proximate to the element of the user interface, display a second availability indicator associated with at least one available output mode proximate to the element of the user interface, and/or identify a type of the element of the user interface and activate a subset of the plurality of input receiving modes according to the type of the element of the user interface. The processing unit may be further operative to receive a selection of the element of the user interface and display an example input appropriate to the element of the user interface.

Yet another embodiment consistent with the invention may comprise a system for providing input mode access. The system may comprise a memory storage and a processing unit coupled to the memory storage. The processing unit may be operative to receive a selection of at least one first element of a plurality of user interface, identify a first type of the at least one first element of the plurality of user interface elements, activate at least a first subset of a plurality of input modes according to the first type, display at least one example input according to the first type, and receive a spoken input to the at least one first element of the plurality of user interface elements. The processing unit may be further operative to de-activate at least one other input element, display an indicator that the speech input mode is receiving the spoken input, and remove the display of the at least one example input from the user interface. The processing unit may be further operative to provide the spoken input to a speech recognizer, wherein the speech recognizer is optimized according to the first type of the at least one first element, receive a recognized input from the speech recognizer, populate the user interface element with the recognized input, receive a selection of at least one second element of the plurality of user interface elements, identify a second type of the at least one second element of the plurality of user interface elements, and activate at least a second subset of the plurality of input modes according to the second type for the at least one second element.

Figure 4:
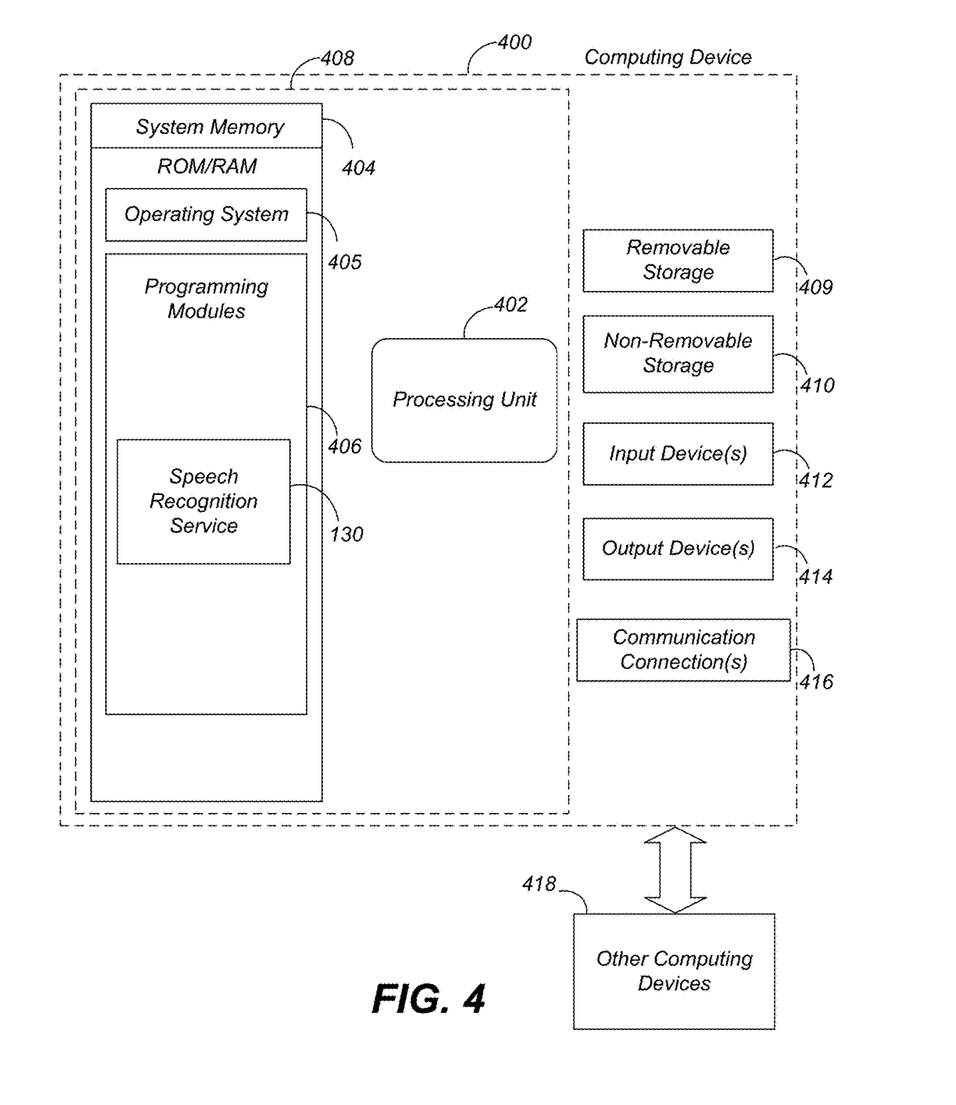
FIG. 4 is a block diagram of a computing device.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIG. 4 and the associated descriptions provide a discussion of a variety of operating environments in which embodiments of the invention may be practiced. However, the devices and systems illustrated and discussed with respect to FIG. 4 are for purposes of example and illustration and are not limiting of a vast number of computing device configurations that may be utilized for practicing embodiments of the invention, described herein.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may comprise speech recognition service 130. Operating system 405, for example, may be suitable for controlling computing device 400's operation. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computing device 400 may also contain a communication connection 416 that may allow device 400 to communicate with other computing devices 418, such as over a network in a distributed computing environment, for example, an intranet or the Internet. Communication connection 416 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, a capture device, etc. A capture device may be operative to record a user and capture spoken words, motions and/or gestures made by the user, such as with a camera and/or microphone. The capture device may comprise any speech and/or motion detection device capable of detecting the speech and/or actions of the user. For example, the capture device may comprise a Microsoft® Kinect® motion capture device comprising a plurality of cameras and a plurality of microphones. Output device(s) 414 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 404, including operating system 405. While executing on processing unit 402, programming modules 406 may perform processes and/or methods as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the invention may be practiced via a system-on-a-chip (SOC) where each and/or many of the components illustrated above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any component of operating environment 100 may operate via application-specific logic integrated with other components of the computing device/system on the single integrated circuit (chip).

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicants. The Applicants retain and reserve all rights in the code included herein, and grant permission to reproduce the material only in connection with reproduction of the granted patent and for no other purpose.

While certain embodiments of the invention have been described, other embodiments may exist. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

We claim:

1. A method for providing input access, the method comprising:
   displaying a user interface on a user device;
   receiving a selection of at least one element of the user interface;
   in response to receiving the selection, identifying a type of the at least one element of the user interface;
   determining a plurality of input receiving modes associated with the identified type, wherein the plurality of input receiving modes includes at least two of: a hardware keyboard, a touchscreen keyboard and a microphone;
   activating a plurality of input receiving modes for the at least one element based on the identified type, wherein the plurality of input receiving modes are ready to receive an input without further interaction with the user interface; and
   when speech input is received using at least one of the plurality of input receiving modes, removing a display of at least one example input from the user interface.

2. The method of claim 1, wherein at least one first element of the input receiving modes of the user device comprises a listening state.

3. The method of claim 2, further comprising:
   receiving a spoken input to the at least one first modes of the receiving modes; and
   providing the spoken input to a speech recognizer.

4. The method of claim 2, wherein at least one second mode of the input receiving mode of the user device comprises a keyboard element displayed on the user interface.

5. The method of claim 1, further comprising:
   receiving an input from the user via at least one first element of the plurality of input receiving modes; and
   deactivating at least one second mode of the plurality of input receiving elements.

6. The method of claim 4, further comprising:
   receiving a selection of at least one second element of the user interface; and
   re-activating the plurality of input receiving modes of the user device.

7. The method of claim 1, further comprising:
   receiving an input from the user via at least one first mode of the plurality of input receiving modes; and
   displaying the received input in the selected at least one element of the user interface.

8. The method of claim 1, further comprising:
   receiving an input from the user via at least one first mode of the plurality of input receiving modes; and
   displaying an indicator that the at least one element of the user interface is actively receiving the input.

9. The method of claim 1, further comprising:
   displaying at least one example input according to the at least one element of the user interface.

10. A system for providing input access, the system comprising:
    a memory storage; and
    a processing unit coupled to the memory storage, wherein the processing unit is operable to:
    display a user interface;
    receive a selection of an element of the user interface and identify a type of the at least one element of the user interface;
    in response to receiving the selection, identify a type of the at least one element of the user interface;

determining a plurality of input receiving modes associated with the identified type, wherein the plurality of input receiving modes includes at least two of: a hardware keyboard, a touchscreen keyboard and a microphone;

activate a plurality of input receiving modes for the at least one element based on the identified type, wherein the plurality of input receiving modes are ready to receive an input without further interaction with the user interface; and receive an input via a first input receiving mode of the plurality of input receiving modes, wherein receiving the speech input causes deactivation of at least one second input receiving mode of the plurality of input receiving modes, and removal of a display of at least one example input from the user interface.

11. The system of claim 10, wherein the processing unit is further operative to:

display an availability indicator associated with at least the first input mode proximate to the element of the user interface.

12. The system of claim 10, wherein the processing unit is further operative to:

display a second availability indicator associated with at least one available output mode proximate to the element of the user interface.

13. The system of claim 10, wherein the processing unit is further operative to:

identify a type of the element of the user interface; and
activate a subset of the plurality of input receiving modes according to the type of the element of the user interface.

14. The system of claim 13, wherein the activated subset of the plurality of input receiving modes comprises a keyboard input mode comprising a non-standard keyboard layout.

15. The system of claim 10, wherein the processing unit is further operative to:

receive a selection of the element of the user interface; and
display an example input appropriate to the element of the user interface.

16. The system of claim 15, wherein the example input comprises a text display.

17. The system of claim 15, wherein the example input comprises a plurality of input options.

18. The system of claim 17, wherein the plurality of input options comprises a list of inputs selectable via at least one of the input receiving modes.

19. The system of claim 17, wherein the plurality of input options comprise a list of frequently received inputs according to a type of the element of the user interface.

20. A computer storage device which stores a set of instructions which when executed performs a method for providing input access, the method execute by the set of instructions comprising:

receiving a selection of at least one first element of a plurality of user interface elements displayed on a user device wherein the user device is operative to receive the selection via at least one of a plurality of input modes comprising at least two of the following: a hardware keyboard, a touchscreen keyboard, and a microphone;

identifying a first type of the at least one first element of the plurality of user interface elements;

activating at least a first subset of a plurality of input modes for the at least one element based on the identified type, wherein the first subset of the plurality of input modes are ready to receive an input without further interaction with the user interface, and wherein the first subset of the plurality of input modes comprise at least a speech input mode and a keyboard input mode;

displaying at least one example input according to the first type;

in response to receiving a spoken input to the at least one first element of the plurality of user interface elements via the speech input mode, removing the display of the at least one example input from the user interface;

de-activating at least the keyboard input mode; displaying an indicator that the speech input mode is receiving the spoken input;

providing the spoken input to a speech recognizer, wherein the speech recognizer is optimized according to the first type of the at least one first element;

receiving a recognized input from the speech recognizer; populating the user interface element with the recognized input; receiving a selection of at least one second element of the plurality of user interface elements;

identifying a second type of the at least one second element of the plurality of user interface elements; and activating at least a second subset of the plurality of input modes according to the second type for the at least one second element.

* * * * *